United States Patent
Martin Brualla et al.

(10) Patent No.: US 12,026,833 B2
(45) Date of Patent: Jul. 2, 2024

(54) FEW-SHOT SYNTHESIS OF TALKING HEADS

(71) Applicant: Google LLC, Mountain View, CA (US)

(72) Inventors: Ricardo Martin Brualla, Seattle, WA (US); Moustafa Meshry, College Park, MD (US); Daniel Goldman, Seattle, WA (US); Rohit Kumar Pandey, Mountain View, CA (US); Sofien Bouaziz, Los Gatos, CA (US); Ke Li, Seattle, WA (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 17/310,678

(22) PCT Filed: Oct. 28, 2020

(86) PCT No.: PCT/US2020/070713
§ 371 (c)(1),
(2) Date: Aug. 17, 2021

(87) PCT Pub. No.: WO2022/076020
PCT Pub. Date: Apr. 14, 2022

(65) Prior Publication Data
US 2022/0130111 A1    Apr. 28, 2022

Related U.S. Application Data

(60) Provisional application No. 63/198,287, filed on Oct. 8, 2020.

(51) Int. Cl.
*G06T 17/20*    (2006.01)
*G06T 7/40*    (2017.01)
*G06T 15/04*    (2011.01)

(52) U.S. Cl.
CPC ............ *G06T 17/20* (2013.01); *G06T 7/40* (2013.01); *G06T 15/04* (2013.01);
(Continued)

(58) Field of Classification Search
None
See application file for complete search history.

(56) References Cited

U.S. PATENT DOCUMENTS 9,094,576 B1 * 7/2015 Karakotsios ............ G10L 15/02
11,200,689 B1 * 12/2021 Smith ..................... G06T 17/00
(Continued)

FOREIGN PATENT DOCUMENTS

JP    2019533324 A    11/2019
WO   2019079895 A1    5/2019
WO   2020165557 A1    8/2020

OTHER PUBLICATIONS

Johannes Lutz Schönberger and Jan-Michael Frahm. 2016. Structure-from-Motion Revisited. In Conference on Computer Vision and Pattern Recognition (CVPR), 2016.*

(Continued)

*Primary Examiner* — Sultana M Zalalee
(74) *Attorney, Agent, or Firm* — Brake Hughes Bellermann LLP

(57) ABSTRACT

Systems and methods are described for utilizing an image processing system with at least one processing device to perform operations including receiving a plurality of input images of a user, generating a three-dimensional mesh proxy based on a first set of features extracted from the plurality of input images and a second set of features extracted from the plurality of input images. The method may further include generating a neural texture based on a three-dimensional mesh proxy and the plurality of input images, generating a representation of the user including at least a neural texture, (Continued)

and sampling at least one portion of the neural texture from the three-dimensional mesh proxy. In response to providing the at least one sampled portion to a neural renderer, the method may include receiving, from the neural renderer, a synthesized image of the user that is previously not captured by the image processing system.

20 Claims, 9 Drawing Sheets

(52) U.S. Cl.
CPC ............... *G06T 2207/10028* (2013.01); *G06T 2207/20081* (2013.01); *G06T 2207/30201* (2013.01)

(56) References Cited

U.S. PATENT DOCUMENTS

| | | | | |
|---|---|---|---|---|
| 11,308,669 | B1* | 4/2022 | Nguyen | G06T 11/60 |
| 2011/0227922 | A1* | 9/2011 | Shim | G06T 15/50 345/426 |
| 2011/0292054 | A1* | 12/2011 | Boker | G06T 9/001 345/473 |
| 2013/0321593 | A1* | 12/2013 | Kirk | G06T 15/04 348/51 |
| 2014/0016871 | A1* | 1/2014 | Son | H04N 23/71 382/154 |
| 2016/0073117 | A1* | 3/2016 | Grasmug | H04N 19/23 375/240.26 |
| 2017/0278289 | A1* | 9/2017 | Marino | G06T 7/11 |
| 2017/0339372 | A1* | 11/2017 | Valli | G06T 15/005 |
| 2018/0068414 | A1* | 3/2018 | Savvides | G06T 3/0093 |
| 2018/0089888 | A1* | 3/2018 | Ondruska | G06T 15/20 |
| 2018/0137611 | A1 | 5/2018 | Kwon et al. | |
| 2018/0158240 | A1* | 6/2018 | Saito | G06V 30/194 |
| 2019/0087985 | A1* | 3/2019 | Li | G06T 15/005 |
| 2019/0147642 | A1 | 5/2019 | Cole et al. | |
| 2020/0160593 | A1* | 5/2020 | Gu | G06T 7/90 |
| 2022/0036635 | A1* | 2/2022 | Li | G06T 7/579 |

OTHER PUBLICATIONS

Sengupta, Soumyadip, et al. "Neural inverse rendering of an indoor scene from a single image." Proceedings of the IEEE/CVF International Conference on Computer Vision. 2019.*

International Search Report and Written Opinion for PCT Application No. PCT/US2020/070713, dated Jul. 2, 2021, 22 pages.

Cao, et al., "Real-Time Facial Animation With Image-Based Dynamic Avatars", ACM Transactions on Graphics, vol. 35, No. 4, Jul. 2016, 12 pages.

Eisert, "Virtual Video Conferencing Using 3D Model-Assisted Image-Based Rendering", Proc. 2nd Conference on Visual Media Production CVMP, Nov. 1, 2005, 10 pages.

Martin-Brualla, et al., "GELATO: Generative Latent Textured Objects", ArXiv.org, Cornell University Library, Aug. 11, 2020, 18 pages.

Nguyen-Phuoc, et al., "Rendernet: a Deep Convolutional Network for Differentiable Rendering From 3D Shapes", 32nd Conference on Neural Information Processing Systems (NeurIPS 2018), 2018, 11 pages.

Tewari, et al., "State of the Art on Neural Rendering", vol. 39, No. 2, arXiv:2004.03805v1, Apr. 8, 2020, 27 pages.

Thies, et al., "Deferred Neural Rendering: Image Synthesis using Neural Textures", ACM Transactions on Graphics, vol. 38, Issue 4, 2019, 12 pages.

Wang, et al., "Few-Shot Video-to-Video Synthesis", 33rd Conference on Neural Information Processing Systems (NeurIPS 2019), Oct. 28, 2019, 14 pages.

Zakharov, et al., "Few-Shot Adversarial Learning of Realistic Neural Talking Head Models", arXiv:1905.08233, Sep. 25, 2019, 21 pages.

First Examination Report for Indian Application No. 202147040550, dated Nov. 6, 2023, 11 pages.

Notice of Allowance for Japanese Application No. 2021-558681 (with English Translation of claims), dated Oct. 17, 2023, 9 pages.

* cited by examiner

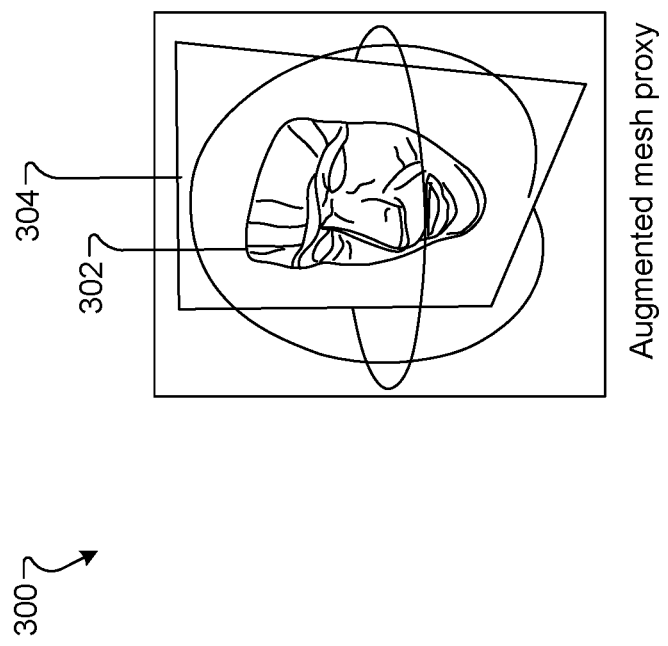

FEW-SHOT SYNTHESIS OF TALKING HEADS

CROSS-REFERENCE TO RELATED APPLICATIONS

This application is a 35 U.S.C. § 371 National Phase Entry Application from PCT/US2020/070713, filed on Oct. 8, 2020, entitled "FEW-SHOT SYNTHESIS OF TALKING HEADS", designating the U.S., which claims the benefit of U.S. Provisional Application No. 63/198,287, filed on Oct. 8, 2020, entitled "FEW-SHOT SYNTHESIS OF TALKING HEADS", the disclosures of which are incorporated herein by reference in their entirety.

TECHNICAL FIELD

This description generally relates to methods, devices, and algorithms used in synthesizing content for presentation.

BACKGROUND

Deep inverse rendering generally includes an optimization of appearance parameters in a latent embedded space that has a spatially-varying appearance. Deep inverse rendering can include the use of neural networks to model appearances of objects. The latent embedded space can be learned using such neural networks. Latent space may represent a space from which a low-dimensional object representation is obtained. Embedding such space represents a way in which the low-dimensional data is mapped to an original higher dimensional image space.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, systems and methods are described for utilizing an image processing system with at least one processing device to perform operations including receiving a plurality of input images of a user, generating a three-dimensional mesh proxy based on a first set of features extracted from the plurality of input images and a second set of features extracted from the plurality of input images. The three-dimensional mesh proxy may include a face mesh proxy and a planar proxy. The method may further include generating a neural texture based on the three-dimensional mesh proxy and the plurality of input images. Optionally, the method includes generating a representation of the user based at least in part on the three-dimensional mesh proxy and the neural texture. The method may further include sampling at least one portion of the neural texture from the three-dimensional mesh proxy. In response to providing the at least one sampled portion to a neural renderer, the method may include receiving, from the neural renderer, a synthesized image of the user that is previously not captured (e.g., unseen) by the image processing system.

These and other aspects can include one or more of the following, alone or in combination. According to some aspects, the methods, systems, and computer-readable mediums claimed herein may include one or more (e.g., all) of the following features (or any combination thereof).

In some implementations, the first set of extracted features includes features that represent a face of the user and the second set of extracted features includes features that represent hair and a portion of a torso of the user. In some implementations, the neural texture is a learned neural texture generated using the plurality of input images where the plurality of input images include fewer than four captured image frames of the user.

In some implementations, generating the neural texture includes generating a latent representation for each input image, aggregating the generated representations for each input image into a vector, providing the vector to a texture generator network and receiving, from the texture generator network, the neural texture representing the user. In some implementations, generating the neural texture includes projecting the extracted first set of features and the second set of features into a geometry-aware feature space based on depth images and UV maps associated with the input images where the projecting includes generating a set of images having a matched resolution of the plurality of input images. Generating the neural texture may also include warping the set of images into UV space to generate a texture for each input image, generating, for each texture, a score map for each point in texture space that indicates a visibility metric in the corresponding input image, applying a soft-max operation to each score map to generate attention weights for each input image, and aggregating the textures according to a weighted average determined according to the attention weights.

In some implementations, the generated representation of the user represents appearance per each surface point represented in the neural texture, and the method further comprises storing an appearance descriptor per surface point to represent high frequency details about the appearance of the user. In some implementations, the synthesized image is generated to depict the user with a corrected viewpoint for a video conference and the corrected viewpoint simulates a view of the user gazing into a camera device associated with a system providing the video conference.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIGS. 3A and 3B depict an example of an augmented mesh proxy generated by combining a face mesh proxy and a planar proxy, according to implementations described throughout this disclosure.

Like reference symbols in the various drawings indicate like elements.

DETAILED DESCRIPTION

Figure 1:
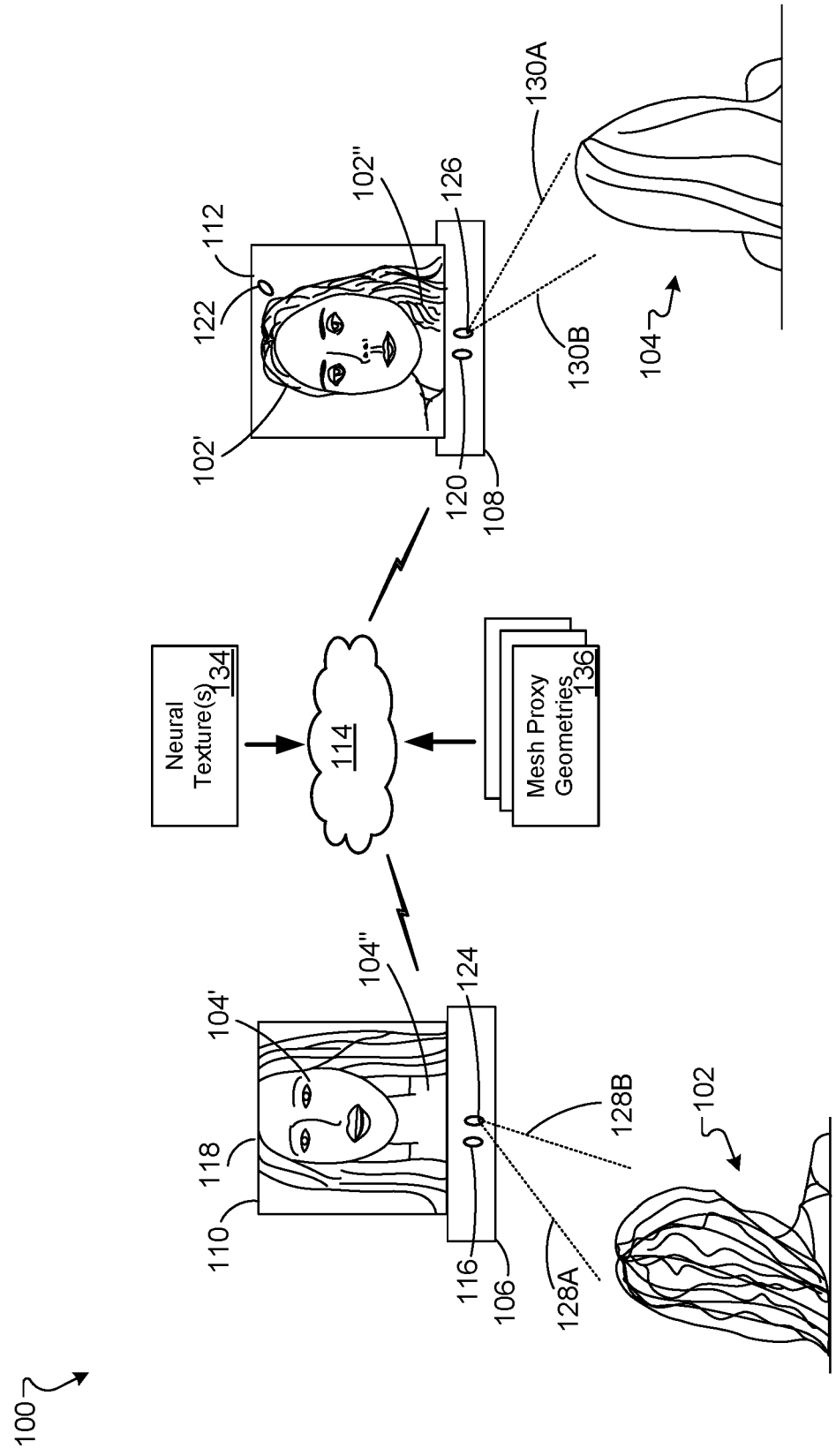
FIG. 1 is a block diagram illustrating an example 3D content system for displaying synthesized content on a display device, according to implementations described throughout this disclosure.

In general, this document describes examples related to modeling novel (e.g., unseen) views of image content. For example, this document includes examples pertaining to modeling novel views of talking heads (e.g., user heads and/or torsos) using relatively few input images. The talking heads may generally include a view with a head, a neck, and/or one or more portions of the torso. As used herein, novel (e.g., unseen) views may include image content and/or video content that has been interpreted (e.g., synthesized, interpolated, modeled, etc.) based on one or more frames of camera-captured image content and/or video content. The interpretation of the camera-captured image content and/or video content may be used in combination with the techniques described herein to create unseen versions and views (e.g., poses, expressions, angles, etc.) of the captured image content and/or video content, for example.

Performing few-shot novel view synthesis for generating views of a head and/or body (e.g., torso) of a user can be challenging when high-quality three-dimensional (3D) views of the user are not available. The systems and techniques described herein may provide a way to generate high quality image content (e.g., images and/or video) of novel torso views using few images as input. In some implementations, the few images may be used in combination with one or more 3D proxy planes and one or more neural textures to model 3D features in order to enable accurate rendering of unseen views of the 3D head and/or torso on a screen of a two-dimensional (2D) or 3D display. In some implementations, the neural textures are based on aggregated latent texture techniques. In some implementations, the neural textures are based on inverse rendering techniques. As used herein, few-shot terminology represents the use of few-shot machine learning techniques in which machine learning is performed to understand new concepts from a few examples.

In some implementations, the neural textures described herein may be used to generate the unseen views for purposes of synthesizing video sequences of speech and/or expressions of a user represented by the neural textures. For example, the neural textures may be used to generate photorealistic head (and/or torso) images based on one or more images (e.g., frame(s), video, etc.). In some implementations, the neural textures may be generated using deferred neural rendering techniques (e.g., deep neural networks) that may synthesize images by combining graphics with learned components.

As used herein, a neural texture represents one or more learned feature map that is trained as part of an image capture process. For example, when an object is captured, a neural texture may be generated by mapping features of the object to a 3D proxy geometry for the object to generate a feature map. In some implementations, a neural texture for an object may be generated based on a latent code associated with a view and a capture pose of the object. In some implementations, a neural texture is stored in one or more 2D map(s) on top of a 3D mesh. Such neural textures may include a set of optimized feature maps that are learned during scene capture, for example. In some implementations, the neural texture may encode a high-level description of a surface appearance of a captured object which can be interpreted by a deferred neural renderer, for example.

In some implementations, the techniques described herein can be used to synthesize images that appear accurate and realistic for display on a screen of a 2D or 3D display used in a multi-way 2D or 3D video conference, for example. For example, the techniques and models described herein can be used to generate and display accurate and realistic views (e.g., image content, video content) of a torso and face. The views include unseen views that may, conventionally, be difficult to depict in a 3D manner. Conventional systems typically do not synthesize novel views for torso portions. For example, the hair, neck, and shoulders may lack a well-defined structure, and thus, may not be represented by the proxy geometry in conventional systems. The systems and methods described herein provide an advantage of modeling face regions as well as regions outside the face regions to ensure neural textures that are robust against degrading the quality of the proxy geometry. In particular, the systems and methods described herein augment a face mesh with a single plane as a coarse geometric proxy for the head regions outside of the face regions.

In some implementations, the techniques described herein may be used for entertainment purposes in film, videos, shorts, game content, or other format including user torsos or faces that may benefit from the few-shot reconstruction techniques described herein. For example, the few-shot reconstruction techniques described herein may be used to generate torso, face, and hair content for moving characters rendered in image and/or video content.

In some implementations, the techniques described herein may be used by virtual assistant devices or other intelligent agents that may perform image processing to recognize objects, recreate objects, and or generate synthesized images from such objects using the few-shot reconstruction techniques described herein.

In some implementations, the techniques described herein use a deep inverse rendering method for few-shot novel view synthesis of a user. The techniques may preserve the visual identity of the user in source images. The techniques may utilize a representation of a user, for example, that includes a 3D mesh proxy and a (e.g., learned) neural texture. For example, a mesh proxy may be or comprise a polygon (e.g., triangle) mesh. In particular, the techniques described herein receive input images including one or more frames of a user with any pose and expression. The received input images are used to compute a latent representation for each frame of the user where each frame is sampled using inverse rendering on a particular texture space. The latent representations may be further aggregated in texture space using an attention mechanism that learns to fuse information from the input views to generate an improved and more complete texture than conventional image generation systems. The techniques described herein can then generate a novel and unseen view/image frame by sampling the texture using a face mesh algorithm which may be reprocessed using a neural renderer. The techniques described herein provide the advantage of preserving user identifying visual features while achieving accurate user torso reconstructions.

Conventional systems may perform a few-shot view synthesis by encoding and aggregating input into a single latent vector. Such a latent vector combines the shape, identity and appearance of an object into the single vector. Because appearance per surface point is typically compressed into such a latent vector, the capability of representing and reconstructing particular visual identity-specific information and high frequency image details may not be possible because the information is overly aggregated and unable to be separated and parsed out of the single latent vector. The systems and methods described herein factor the representation of an object (e.g., head, torso, user, etc.) into a 3D mesh proxy and a learned neural texture. In addition, the systems and methods represent object appearance per each surface point using the neural texture. Storing an appearance descriptor per surface point using the neural texture provides a way to represent high frequency image details and an increased amount of identity-sensitive information.

In addition, the systems and methods described herein utilize face mesh algorithms to define geometric representations for a face of a user in combination with a coarse geometry proxy to represent the remainder of the head and/or torso structures of the user. In some implementations, the coarse geometry proxy includes at least one plane to represent the hair, one or more shoulders, neck, etc.

FIG. 1 is a block diagram illustrating an example 3D content system 100 for displaying content in a stereoscopic display device, according to implementations described throughout this disclosure. The 3D content system 100 can be used by multiple users to, for example, conduct video conference communications in 3D (e.g., telepresence sessions). In general, the system of FIG. 1 may be used to capture video and/or images of users during a 2D or 3D video conference and use the systems and techniques described herein to model a shape and appearance of user face portions and/or torso portions, in order to render accurate images depicting the user face portions and/or torso portions within the video conference session.

System 100 may benefit from the use of the techniques described herein because such techniques can generate and display poses, expressions, and user image portions, within a video conference for example, that accurately represent the user in the video conference, but may be a computed latent representation for an actual captured image frame. The computed latent representation may be used with the techniques described herein to generate accurate texture and imagery of a user that may be displayed to another user in a 2D and/or 3D manner via system 100, for example.

As shown in FIG. 1, the 3D content system 100 is being used by a first user 102 and a second user 104. For example, the users 102 and 104 are using the 3D content system 100 to engage in a 3D telepresence session. In such an example, the 3D content system 100 can allow each of the users 102 and 104 to see a highly realistic and visually congruent representation of the other, thereby facilitating the users to interact in a manner similar to being in the physical presence of each other.

Each user 102, 104 can have a corresponding 3D system. Here, the user 102 has a 3D system 106 and the user 104 has a 3D system 108. The 3D systems 106, 108 can provide functionality relating to 3D content, including, but not limited to capturing images for 3D display, processing and presenting image information, and processing and presenting audio information. The 3D system 106 and/or 3D system 108 can constitute a collection of sensing devices integrated as one unit. The 3D system 106 and/or 3D system 108 can include some or all components described with reference to FIGS. 2-6, and 8.

The 3D content system 100 can include one or more 2D or 3D displays. Here, a 3D display 110 is provided for the 3D system 106, and a 3D display 112 is provided for the 3D system 108. The 3D displays 110, 112 can use any of multiple types of 3D display technology to provide an autostereoscopic view for the respective viewer (here, the user 102 or user 104, for example). In some implementations, the 3D displays 110, 112 may be a standalone unit (e.g., self-supported or suspended on a wall). In some implementations, the 3D displays 110, 112 can include or have access to wearable technology (e.g., controllers, a head-mounted display, etc.). In some implementations, displays 110, 112 may be 2D displays.

In general, displays, such as displays 110, 112 can provide imagery that approximates the 3D optical characteristics of physical objects in the real world without the use of a head-mounted display (HMD) device. In general, the displays described herein include flat panel displays, lenticular lenses (e.g., microlens arrays), and/or parallax barriers to redirect images to a number of different viewing regions associated with the display.

In some implementations, the displays 110, 112 can include a high-resolution and glasses-free lenticular 3D display. For example, displays 110, 112 can include a microlens array (not shown) that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some example displays, there may be a single location that provides a 3D view of image content (e.g., users, objects, etc.) provided by such displays. A user may be seated in the single location to experience proper parallax, minimal distortion, and realistic 3D images. If the user moves to a different physical location (or changes a head position or eye gaze position), the image content (e.g., the user, objects worn by the user, and/or other objects) may begin to appear less realistic, 2D, and/or distorted. The systems and techniques described herein may reconfigure the image content projected from the display to ensure that the user can move around, but still experience proper parallax, low rates of distortion, and realistic 3D images in real time. Thus, the systems and techniques described herein provide the advantage of maintaining and providing 3D image content and objects for display to a user regardless of any user movement that occurs while the user is viewing the 3D display.

As shown in FIG. 1, the 3D content system 100 can be connected to one or more networks. Here, a network 114 is connected to the 3D system 106 and to the 3D system 108. The network 114 can be a publicly available network (e.g., the Internet), or a private network, to name just two examples. The network 114 can be wired, or wireless, or a combination of the two. The network 114 can include, or make use of, one or more other devices or systems, including, but not limited to, one or more servers (not shown).

The 3D systems 106, 108 can include multiple components relating to the capture, processing, transmission or reception of 3D information, and/or to the presentation of 3D content. The 3D systems 106, 108 can include one or more cameras for capturing image content for images to be included in a 3D presentation. Here, the 3D system 106 includes cameras 116 and 118. For example, the camera 116 and/or camera 118 can be disposed essentially within a housing of the 3D system 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the 3D system 106). The cameras 116 and 118 can be positioned and/or oriented so as to capture a sufficiently representative view of a user (e.g., user 102). While the cameras 116 and 118 generally will not obscure the view of the 3D display 110 for the user 102, the placement of the cameras 116 and 118 can be arbitrarily selected. For example, one of the cameras 116, 118 can be positioned somewhere above the face of the user 102 and the other can be positioned somewhere below the face. For example, one of the cameras 116, 118 can be positioned somewhere to the right of the face of the user 102 and the other can be positioned somewhere to the left of the face. The 3D system 108 can in an analogous way include cameras 120 and 122, for example. Additional cameras are possible. For example, a third camera may be placed near or behind display 110.

In some implementations, the 3D systems 106, 108 can include one or more depth sensors to capture depth data to be used in a 3D presentation. Such depth sensors can be considered part of a depth capturing component in the 3D content system 100 to be used for characterizing the scenes captured by the 3D systems 106 and/or 108 in order to correctly represent the scenes on a 3D display. In addition, the system can track the position and orientation of the viewer's head, so that the 3D presentation can be rendered with the appearance corresponding to the viewer's current point of view. Here, the 3D system 106 includes a depth sensor 124. In an analogous way, the 3D system 108 can include a depth sensor 126. Any of multiple types of depth sensing or depth capture can be used for generating depth data.

In some implementations, an assisted-stereo depth capture is performed. The scene can be illuminated using dots of lights, and stereo-matching can be performed between two respective cameras, for example. This illumination can be done using waves of a selected wavelength or range of wavelengths. For example, infrared (IR) light can be used. In some implementations, depth sensors may not be utilized when generating views on 2D devices, for example. Depth data can include or be based on any information regarding a scene that reflects the distance between a depth sensor (e.g., the depth sensor 124) and an object in the scene. The depth data reflects, for content in an image corresponding to an object in the scene, the distance (or depth) to the object. For example, the spatial relationship between the camera(s) and the depth sensor can be known, and can be used for correlating the images from the camera(s) with signals from the depth sensor to generate depth data for the images.

The images captured by the 3D content system 100 can be processed and thereafter displayed as a 3D presentation. As depicted in the example of FIG. 1, 3D image of face 104' and torso and hair 104" are presented on the 3D display 110. As such, the user 102 can perceive the 3D image 104' and torso and hair 104" as a 3D representation of the user 104, who may be remotely located from the user 102. The 3D image 102' and torso and hair 102" is presented on the 3D display 112. As such, the user 104 can perceive the 3D image 102' as a 3D representation of the user 102.

The 3D content system 100 can allow participants (e.g., the users 102, 104) to engage in audio communication with each other and/or others. In some implementations, the 3D system 106 includes a speaker and microphone (not shown). For example, the 3D system 108 can similarly include a speaker and a microphone. As such, the 3D content system 100 can allow the users 102 and 104 to engage in a 3D telepresence session with each other and/or others. In general, the systems and techniques described herein may function with system 100 to generate image content and/or video content for display amongst users of system 100.

Generating image content to be displayed on the telepresence system 100 may include the use of any number of neural textures 134 and one or more proxy geometries, which may be mesh proxy geometries 136. As used here, mesh proxy geometries represent two or more view dependent textures mapped to a particular mesh geometry. For example, the mesh proxy geometries 136 may represent multiple combined proxy geometries, such as a face proxy geometry combined with a planar proxy geometry, for example. In operation, the system 100 may access and/or otherwise utilize system 200 to extract features from input images, generate one or more neural textures 134 using the features and one or more proxy geometries, and synthesize one or more novel views based on the neural textures 134 and the mesh proxy geometries 136.

Figure 2:
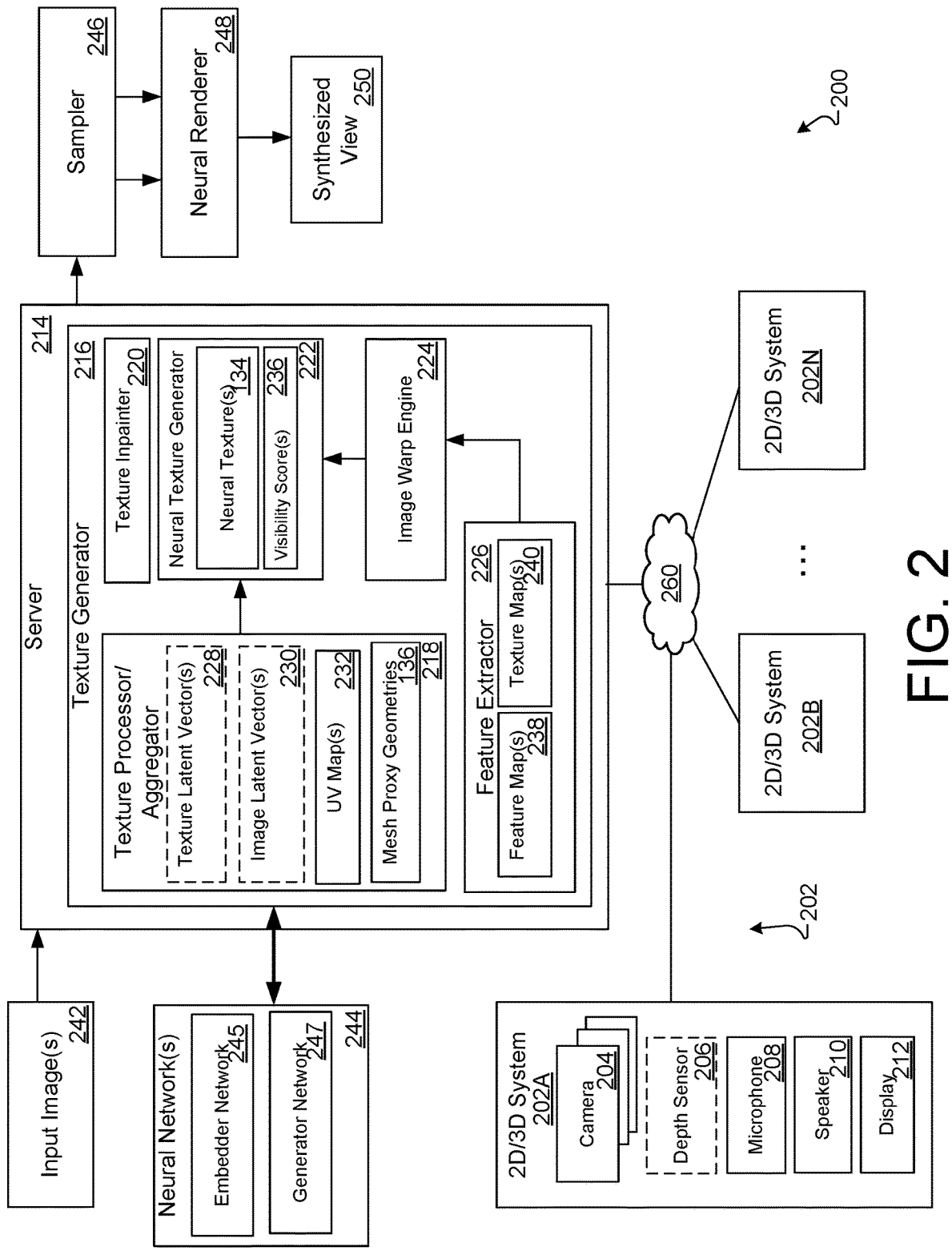
FIG. 2 is a block diagram of an example system for synthesizing content for rendering on a display, according to implementations described throughout this disclosure.

FIG. 2 is a block diagram of an example system 200 for synthesizing content for rendering, according to implementations described throughout this disclosure. The system 200 can serve as, or be included within, one or more implementations described herein, and/or can be used to perform the operation(s) of one or more examples of synthesizing, processing, modeling, or presentation of the image content described herein. The overall system 200 and/or one or more of its individual components, can be implemented according to one or more examples described herein.

The system 200 may include one or more 3D systems 202. In the depicted example, 3D systems 202A, 202B through 202N are shown, where the index N indicates an arbitrary number. The 3D system 202 can provide for capturing of visual and audio information for a 2D or a 3D presentation, and forward the 2D or 3D information for processing. Such information can include images of a scene, depth data about the scene, and audio from the scene. For example, the 2D/3D system 202 can serve as, or be included within, the system 106 and 2D/3D display 110 (FIG. 1).

The system 200 may include multiple cameras, as indicated by cameras 204. Any type of light-sensing technology can be used for capturing images, such as the types of images sensors used in common digital cameras. The cameras 204 can be of the same type or different types. Camera locations may be placed within any location on a 3D system such as system 106, for example.

The system 202A includes a depth sensor 206. In some implementations, the depth sensor 206 operates by way of propagating IR signals onto the scene and detecting the responding signals. For example, the depth sensor 206 can generate and/or detect the beams 128A-B and/or 130A-B. In some implementations, the depth sensor 206 is an optional component, for example, in 2D video conferencing applications that do not utilize depth sensing. The system 202A also includes at least one microphone 208 and a speaker 210. In some implementations, the microphone 208 and speaker 210 may be part of system 106.

The system 202 additionally includes a 3D display 212 that can present 3D images. In some implementations, the 3D display 212 can be a standalone display and in some other implementations the 3D display 212. In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes. In some implementations, the 3D display 212 operates using lenticular lenses. For example, alternating rows of lenses can be placed in front of the screen, the rows aiming light from the screen toward the viewer's left and right eyes, respectively.

The system 200 can include a server 214 that can perform certain tasks of data processing, data modeling, data coordination, and/or data transmission. The server 214 and/or components thereof can include some or all components described with reference to FIG. 8.

The server 214 includes a texture generator 216 that can be responsible for generating 2D and/or 3D information in one or more ways. This can include receiving image content (e.g., from the 3D system 202A), processing the image content and/or forwarding the (processed) image content to another participant (e.g., to another of the 3D systems 202).

The texture generator 216 may be trained by a generative latent optimization framework, according to implementations described throughout this disclosure. In general, the texture generator 216 may use two or more 3D proxy geometries to parameterize neural textures using a generative model that can produce a variety of shapes and appearances of objects (e.g., users, subjects, expressions, characteristics, etc.).

In operation, the texture generator 216 may represent an object by generating a map of features (e.g., a feature map 238). The feature map 238 may represent a latent code for each object instance i as $z_i \in R^n$. The feature map 238 of latent space may be an eight dimensional (8D) map. The feature map 238 may include random values that are optimized using system 200, for example.

The feature map 238 may be provided to one or more neural networks 244 to generate a number of neural textures 134. The neural textures 134 may represent portions of a mesh that define some portion of geometry and/or texture for a particular object represented in the feature map 238.

The texture generator 216 may use a coarse geometry that includes a set of K proxies $\{P_{i,1}, \ldots, P_{i,k}\}$ (i.e., triangular meshes with UV coordinates). For example, the architecture 400 may project a 2D image to a 3D proxy model surface in order to generate the neural textures 134. The UV coordinates denote the axes of the 2D texture. The proxies function to represent a version of the actual geometry of any or all of the collection of objects in the class.

In operation, system 200 uses proxy geometry principles to encode a geometric structure using a set of coarse proxy surfaces (e.g., mesh proxy geometries 136) as well as shape, albedo, and view dependent effects using view-dependent neural textures 134.

As shown in FIG. 2, the texture generator 216 includes a texture processor/aggregator 218, a texture in-painter 220, a neural texture generator 222, an image warp engine 224, and a feature extractor 226. The texture processor/aggregator 218 is configured to generate a neural texture using a few-shot embedder network, such as embedder network 245 of neural network 244. The embedder network may be used to generate a per-image texture latent vector 228 in addition to an image latent representation (e.g., an image latent vector 230). The k-shot texture latents may then be aggregated by texture processor aggregator 218. The aggregated texture latent may then be provided to a texture generator network (e.g., generator network 247) to obtain a neural texture 134 for a target subject (e.g., user image). The texture latent vector(s) 228 and the image latent vector(s) 230 are shown in dotted line form to indicate that each element may be optional in the system 200 if, for example, the texture generator 216 generates the neural texture using method that does not include aggregated latents.

In some implementations, the system 200 may build a latent space of particular content (e.g., objects, features, image frames, etc.) and may feed the latent space of such content to the neural network 244, for example, which may then generate a texture map 240 for each particular content type. In some implementations, the system 200 may reduce a number of instances of planar proxies out of the training data to execute few-shot reconstruction while using the remaining proxies of a particular object to train a category-level model for the neural network. For example, the remaining proxies may represent hairstyle images, which can be used to train a hair category for the neural network 244. Such a category may be used to simulate new views of hair on particular user images.

For example, in some implementations, the texture processor/aggregator 218 may not use the aggregated texture latents, but may instead employ inverse rendering using UV maps 232 and mesh proxy geometries 136 to generate the neural textures. The UV maps 232 may represent visible content included in a particular mesh proxy. The visible content may be used to generate one or more UV map 232 according to the texture coordinates. The UV map 232 may be provided to the feature extractor 226, for example to condition the extraction of features (into feature maps 238) in a particular set of images. The UV map 232 may enable the system 200 to allow the neural networks 244 to obtain relevant data with respect to particular images and/or features represented in the images.

In some implementations, the texture processor/aggregator 218 may generate representations of the user (e.g., latent representations stored in texture latent vectors 228 and/or image latent vectors 230) that take into account particular user features. For example, the aggregator 218 may obtain input images (e.g., multiple frames of a person under any pose and expression) and may compute a latent representation (e.g., texture latent vectors 228) for each input frame. The images may be sampled using the generated representations of the user (e.g., texture latent vectors 228 and/or image latent vectors 230) using inverse rendering on texture space. The latent representations may be further aggregated in texture space using an attention mechanism that learns to fuse information from the input views to create an improved and more complete neural texture 134. To generate a novel frame (e.g., synthesized view 250, the neural texture 134 is sampled from the mesh proxy geometries 136 using the latent representation (e.g., the generated representations of the user) and reprocessed using the neural renderer 248.

The system 200 includes or has access to at least one neural network 244. As shown, the neural networks 244 include at least an embedder network 245 and a generator network 247. The embedder network 245 includes one or more convolution layers and down-sampling layers. The generator network 247 includes one or more convolution layers and up-sampling layers.

The texture in-painter 220 may generate content that may be missing from a particular texture based on a local neighborhood of pixels surrounding a particular missing content portion. In some implementations, the texture in-painter 220 may function based on large portions of the texture being symmetric around a vertical axis and thus, missing parts from one half of the texture may be approximated from corresponding values of the other half of the texture. The system 200 may concatenate the aggregated neural texture with a horizontally flipped version of the neural texture. The concatenated version of the neural texture can be provided to the texture in-painter 220 in order to generate a final symmetric neural texture.

The neural texture generator 222 may generate neural textures 134. Neural textures 134 represent learned feature maps 238 which are trained as part of an image capture process. For example, when an object is captured, a neural texture may be generated using the feature map 238 and one or more 3D proxy geometries 136 for the object. In operation, system 200 may generate and store the neural texture 134 for a particular object (or scene) as a map on top of one or more 3D proxy geometry 136 for that object. For example, neural textures may be generated based on a latent code associated with each instance of the identified category and a view associated with the pose.

The visibility scores 236 may represent the visibility of a particular pixel or feature of a captured object. Each visibility score 236 may represent a single scalar value for each of the neural textures which indicate which portions (e.g., pixels, features, etc.) of the image are visible in a particular view of an input image. For example, if a far left side of a user's face is not viewable in an input image of the user, the visibility score 236 for the pixels that represent the far left side of the user's face may be weighted low while other areas that can be viewed and/or are captured well in the input image may be weighted high.

The image warp engine 224 warps images from input image space (e.g., feature space) into texture space. For example, particular input images are warped into UV space to generate a neural texture (in texture space).

The feature extractor 226 is a U-net neural network that analyzes an image to generate features for each pixel. The feature extractor 220 may use such features to generate feature maps 238 and texture maps 240.

The sampler 246 may represent a 2D sampler that samples from a particular mesh proxy geometry for any novel view. The sampled texture is then provided to the neural renderer 248.

The neural renderer 248 may generate an intermediate representation of an object (e.g., user) and/or scene, for example, that utilizes the neural network 244 to render. Neural textures 134 may be used to jointly learn features on a texture map (e.g., texture map 240) along with a U-Net, such as neural network 244 operating with neural renderer 248. The neural renderer 248 may incorporate view dependent effects by modelling the difference between true appearance (e.g., a ground truth) and a diffuse reprojection with an object-specific convolutional network, for example. Such effects may be difficult to predict based on scene knowledge and as such, GAN-based loss functions may be used to render realistic output.

In operation, the server 214 may obtain or receive input images 242. The texture generator 216 may process the input images 242 using one or more neural networks 244. The server 214 may utilize texture generator 216, a sampler 246, and a neural renderer 248 in order to generate synthesized views 250.

The system 200 and neural networks 244 within system 200 may be trained end-to-end using a mixture of reconstruction losses ($L_{CNT}$), identity preservation loss ($L_{ID}$), and adversarial losses ($L_{ADV}$) according to equation [1] below:

$$L(\varphi, \omega, \psi, \theta, \xi) = L_{ADV} + \lambda_{ID}L_{ID} + \lambda_{CNT}L_{CNT} \quad [1]$$

Reconstruction error between the ground truth target image $I_t$ and the prediction $\hat{I}_t$ is computed using a mixture of an L1 loss and a perceptual loss based on a pretrained VGG16 network as well as pretrained face algorithm mesh network, according to equation [2] below:

$$L_{CNT} = \lambda_{L1}L_1 + \lambda_{VGG}L_{VGG} + \lambda_{FN}L_{FN} \quad [2]$$

The system 200 may perform subject fine-tuning. For example, at test time, few-shot reconstruction can be applied to unseen test subjects. In some implementations, the number of few shots need not be fixed and can vary between different test subjects. Given a set of few-shot frames of a target subject, the system 200 may perform simple fine-tuning of the neural networks 244 or other network within system 200 to fit the target subject. Fine-tuning can be applied to any subset of modules of the system 200. For example, fine-tuning may be applied to the texture generator 216 (represented as $G^{tex}$), the neural renderer 248 (represented as R), and a discriminator D (not shown). In addition, the system may fine-tune network weights by directly optimizing the latent representation of a particular target subject. For example, the system 200 may treat the predicted neural texture as free variables, and may optimize the neural network jointly with the neural renderer 248 to better fit the target subject. Optimizing neural textures can provide an advantage of being more interpretable than optimizing latent vector representations, since visualizing the neural texture may depict the high frequency details that are added during the fine-tuning stage.

The exemplary components above are here described as being implemented in the server 214, which can communicate with one or more of the 3D systems 202 by way of a network 260 (which can be similar or identical to the network 114 in FIG. 1). In some implementations, the texture generator 216 and/or the components thereof, can instead or in addition be implemented in some or all of the 3D systems 202. For example, the above-described modeling and/or processing can be performed by the system that originates the 3D information before forwarding the 3D information to one or more receiving systems. As another example, an originating system can forward images, modeling data, depth data and/or corresponding information to one or more receiving systems, which can perform the above-described processing. Combinations of these approaches can be used.

The system 200 is an example of a system that includes cameras (e.g., the cameras 204), a depth sensor (e.g., the depth sensor 206), and a 3D content generator (e.g., the texture generator 216) having a processor executing instructions stored in a memory. Such instructions can cause the processor to identify, using depth data included in 3D information (e.g., by way of a depth processing component), image content in images of a scene included in the 3D information. The processor can generate modified 3D information by sampling a neural texture 134, which may be provided to texture generator 216 to properly depict the synthesized view 250, for example.

The synthesized view 250 represents a 3D stereoscopic image of a particular object (e.g., user image 412, 512, 610) with proper parallax and viewing configuration for both eyes associated with the user accessing a display (e.g., display 212) based at least in part on an augmented face mesh, as described herein. At least a portion of the synthesized view 250 may be determined based on output from a neural network 244, for example, using system 200 each time the user moves a head position while viewing the display. In some implementations, the synthesized view 250 represents a user's face and other features of the user surrounding the user's face and within a view capturing the user's face.

In some implementations, processors (not shown) of systems 202 and 214 may include (or communicate with) a graphics processing unit (GPU). In operation, the processors may include (or have access to memory, storage, and other processor (e.g., a CPU)). To facilitate graphics and image generation, the processors may communicate with the GPU to display images on a display device (e.g., display device 212). The CPU and the GPU may be connected through a high speed bus, such as PCI, AGP, or PCI-Express. The GPU may be connected to the display through another high speed interface such as HDMI, DVI, or Display Port. In general, the GPU may render image content in a pixel form. The display device 212 may receive image content from the GPU and may display the image content on a display screen.

FIG. 3A is a block diagram of an example of an augmented mesh proxy 300 generated from combining an augmented face mesh proxy and a planar proxy as a coarse geometric proxy, according to implementations described throughout this disclosure. The augmented mesh proxy 300 may be used to synthesize image and/or video content of a user including, but not limited to, facial features, hair features, and/or torso features associated with the user.

The augmented mesh proxy 300 may be generated by combining two or more proxy geometry representations. For example, the augmented mesh proxy 300 may be generating by combining representations of a user face determined using a 3D augmented face mesh proxy 302 with a planar proxy 304, which in this example represents user hair and/or part of a user torso (e.g., a remainder of the user's head/torso portions that are not included in the face mesh proxy 302). For example, a face mesh algorithm can be combined with a single plane geometric proxy to generate an accurate synthesis of an image of the head and torso of a user. The face mesh proxy 302 and the planar proxy 304 may be represented as mesh proxy geometries 136, for example, as shown in FIG. 1.

The face mesh proxy 302 may represent texture coordinates that correspond to visible content in an input image. For example, visible content may include the face portions of proxy 302, but may not include the background surrounding the face portions of proxy 302. The visible content may be used to generate a UV map (e.g., UV map 232) according to the texture coordinates. The UV map 232 may be provided to the feature extractor 226, for example to condition the extraction of features in a particular set of images. The UV map 232 may enable the system 200 to allow the neural networks 244 to obtain relevant data with respect to particular images and/or features represented in the images.

The face mesh may be generated using a convolutional neural network that, given an image, outputs a series of coefficients representing the 3D locations of a set of prescribed vertices whose predefined topology represents a face. The 3D locations are such that they align with the spatial coordinates of the input images while the depth dimension may be arbitrary or in metric units.

The planar proxy 304 is depicted as a plane placed to include the user face (e.g., in a view perpendicular to the plane) and surrounding areas (e.g., hair, torso, etc.). The planar proxy 304 represents a planar billboard modeling the head of a user. Other objects and planar proxy shapes representing such content may be utilized by the systems and techniques described herein to generate and render 3D content. For example, other proxies may include, but are not limited to a box, a cylinder, a sphere, a triangle, etc.

A planar proxy may represent a texture-mapped object (or portion of an object) that may be used as a substitute for complex geometry. Because manipulating and rendering geometric proxies is less computationally intensive than manipulating and rendering corresponding detailed geometry, the planar proxy representations may provide a simpler shape in which to reconstruct a view. The planar proxy representation may be used to generate such a view. The use of a planar proxy may provide an advantage of a low computational cost when attempting to manipulate, reconstruct, and/or render objects with highly complex appearance such as eyeglasses, cars, clouds, trees, and grass, just to name a few examples. Similarly, with the availability of powerful graphics processing units, real time game engines offer can use such proxies (e.g., geometric representations) with multiple levels of detail that can be swapped in and out with distance, using 3D proxy geometries to generate maps to supplant geometry at lower levels of detail.

In operation, the system 200 may generate planar proxy 304 by computing a bounding box (e.g., a coarse visual hull) for a head portion, for example, using extracted alpha masks. In general, the alpha masks represent, for any number of pixels in the head portion, how particular pixel colors are to be merged with other pixels when overlaid. The system 200 may then specify a region of interest in the image of the user's head. The region of interest may be specified using head coordinates, for example. The system 200 may then extract a plane that probabilistically matches the surface as viewed from a corresponding orthographic projection.

In general, the system 200 may generate planar proxies for any number of images, which may be used as training data that is input to a neural network (e.g., neural network 244). The neural network may determine how to properly display particular objects (e.g., head portions, face portions, etc.) captured by a camera, for example. In some implementations, the system 200 may generate a view of a particular head portion by assembling a dataset of images that include the head portion and using the detected pose to simulate the head portion from a viewpoint based on the pose, for example.

The augmented mesh proxy 300 may be used to ensure accurate representation and reproducibility of the face and other head features associated with a user head. For example, to include regions outside of the face area in a synthesized image, the augmented mesh proxy 300 can be used to generate neural textures that are robust against degrading the quality of a synthesized image. Such neural textures may be generated by combining data representing 3D transformations and data representing image perspectives and learned rendering techniques to synthesize new image content.

Figure 3B:
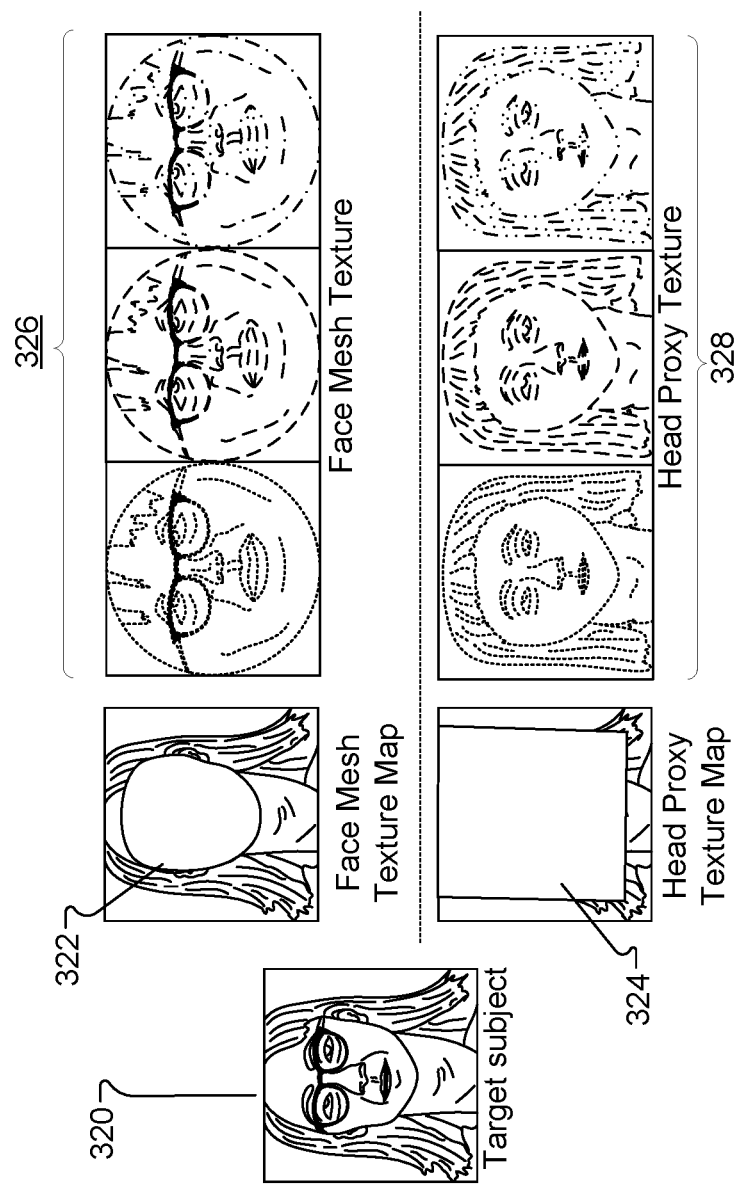

FIG. 3B illustrates example input used to generate the augmented mesh proxy, according to implementations described throughout this disclosure. For example, an input image 320 may be obtained. The input image 320 may, for example, represent a target subject (e.g., a user). The input image may be used to generate a number of texture maps. Texture maps may represent 2D and 3D images of the user. Texture maps use a 2D image representation in order to generate a 3D model, in UV space, where "U" and "V" represent the 2D texture axes. The texture maps may be used by system 200, for example, map a function onto a surface in 3D. The function domain may be 1D, 2D, or 3D and may be represented as a mathematical function (e.g., an array). The texture space may be defined by the UV space which can be mapped to object space (e.g., x, y, and z-coordinate space). The system 200 may also use texture maps to predict new texture coordinates.

For example, the system 200 may generate a face mesh texture map 322 which may be used to generate face mesh proxy 302. Similarly, the system 200 may generate a head proxy U texture map 324, which may be used to generate planar proxy 304. The texture maps generated by system 200 can be used to generate neural textures. For example, the system 200 may use the face mesh proxy 302 and the face mesh texture map 322 to generate neural textures 326 representing the face of the user 320. Similarly, the system 200 may use the planar proxy 304 and the head proxy texture map 324 to generate neural textures 328 representing the remainder of the head (e.g., hair, torso, etc.) of the user 320. Thus, the system 200 may generate a learned neural texture for a user by combining the face mesh texture 326 with the head proxy texture 328. In general, appearance per each surface point is represented in the learned neural texture. Storing an appearance descriptor per surface point provides the advantage of representing high frequency details and accurate identity-sensitive information.

Figure 4:
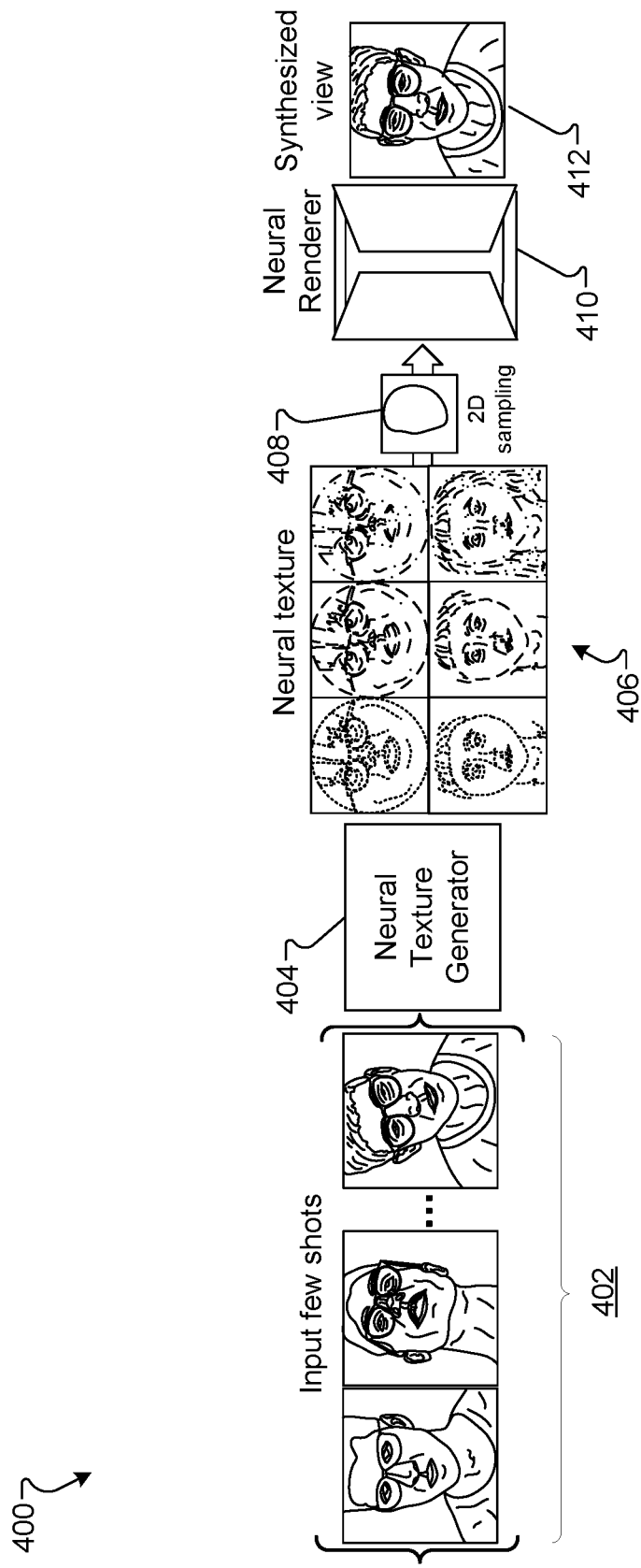
FIG. 4 is a block diagram of example architecture for generating synthesized content for rendering on a display, according to implementations described throughout this disclosure.

FIG. 4 is a block diagram of example architecture 400 for generating synthesized content for rendering, according to implementations described throughout this disclosure. The architecture 400 includes a number of input images 402 (e.g., input few shots), which may be as few as three input images. The architecture 400 also includes a neural texture generator 404 to generate neural textures 406. The architecture 400 also includes a 2D sampling module 408, a neural renderer 410, which may be used in combination with the neural texture generator to generate a synthesized view 412 of the user shown in the input images 402. For example, the neural renderer 410 is a renderer comprising and/or using a neural network.

In operation, given few-shot images (e.g., input images 402) of a target subject (e.g., user), the system 200 may perform a novel view synthesis of the user in input images 402. For example, the system 200 may process the input images 402 using neural texture generator 404 and aggregate the processed images to construct an augmented mesh proxy 300 and a learned neural texture 406 for the target subject (e.g., the user of input images 402). The system 200 may then sample the learned neural texture 406 from the proxy geometry and input the sampled points (e.g., performed by sampling module 408) to a neural renderer network (e.g., neural renderer 410) which may then synthesize a target view of the user in the input images 402.

The system 200 may implement architecture 400 using a first architecture 500 that includes an encoder-decoder architecture to generate the neural texture 406 for the target subject in the input images 402. Alternatively, the system 200 may implement the architecture 400 using a second architecture 600 that uses inverse rendering techniques to generate the neural texture 406 for the target subject in the input images 402.

Figure 5:
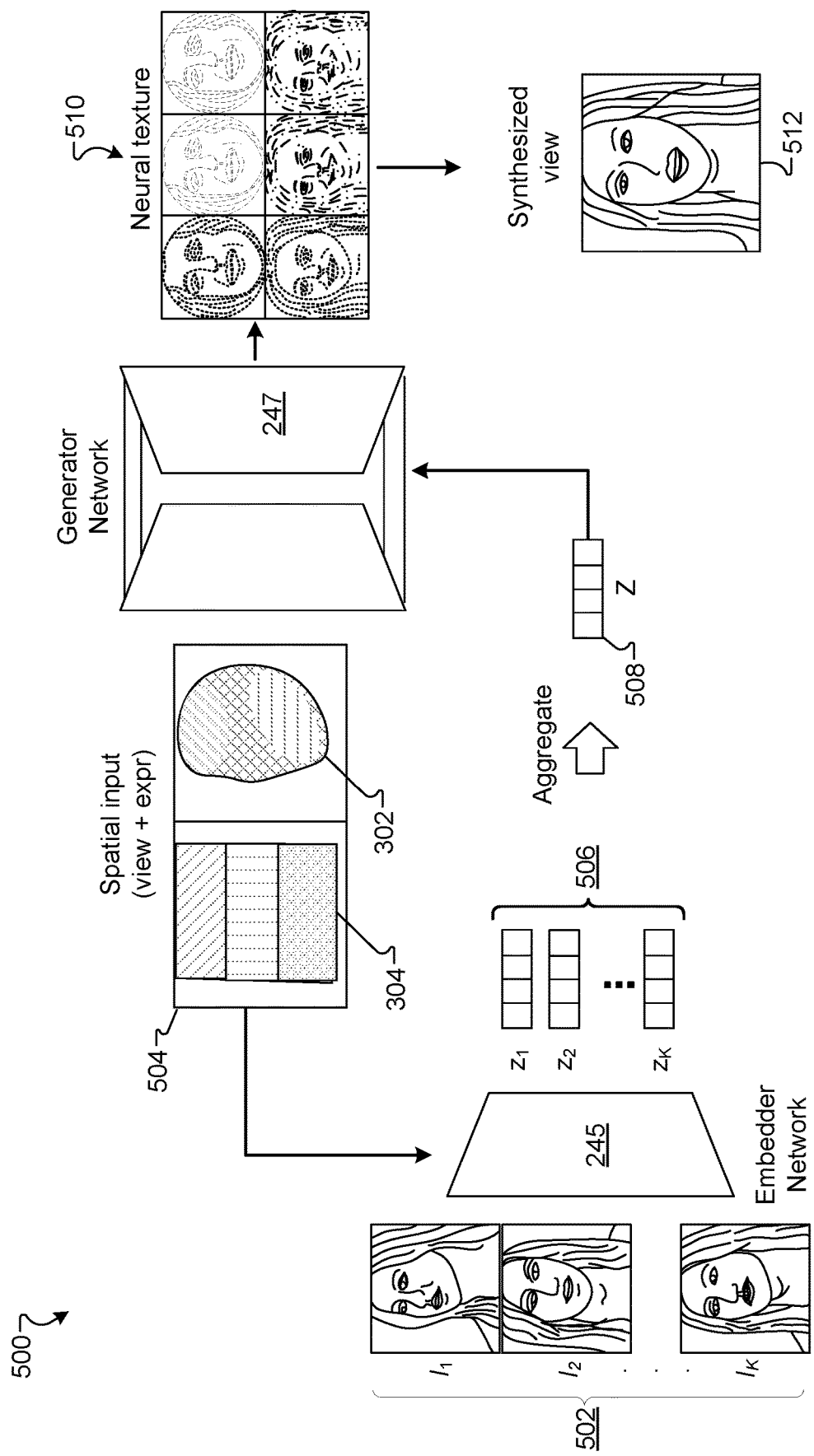
FIG. 5 is a block diagram of an example architecture for generating neural textures from aggregated latent texture techniques, according to implementations described throughout this disclosure.

FIG. 5 is a block diagram of example architecture 500 for generating neural textures using aggregated latent texture techniques, according to implementations described throughout this disclosure. The neural texture (e.g., neural texture 510) may be learned from neural network 244 using neural texture generator 222, for example. The texture generator 216 of system 200 can be conditioned to carry out architecture 400 using the sampled neural texture generated by the components of FIG. 5, for example. The texture generator 216 may represent an image synthesis network which can be conditioned on a sampled neural texture (e.g., neural texture 510) rather than conventional systems which sample sparse 2D landmarks within an image.

To generate a sampled neural texture, the system 200 may obtain input images 502 (depicted here as images $\{I_1, I_2 \ldots I_k\}$). The input images 502 may include a number of views (e.g., poses) of a user captured by a camera device. The input views may be provided to an embedder network, such as embedder network 245. The embedder network 245 may represent a network that maps input images 502 (e.g., face, torso, or any combination of user portion) to embedding vectors 506 (depicted here as $\{z_1, z_2 \ldots z_k\}$, which generally store pose-independent information. In some implementations, the system 200 may provide a spatial input 504 to embedder network 245. For example, the spatial input 504 may be represented as the proxy geometry of FIG. 3A (e.g., 3D augmented face mesh proxy 302 and planar proxy 304). The proxy geometry of the 3D augmented face mesh proxy 302 combined with the planar proxy 304 to create the spatial input 504.

The embedding vectors 506 may be aggregated using aggregator 218, for example. The result of aggregating vectors 506 may be an aggregated vector 508 (shown here as z). The aggregated vector 508 may be provided to the texture generator network 247. The texture generator network 247 represents a network that may map aggregated embedding vectors to generate the neural texture 510, for example. The outputted neural texture 510 may be used with architecture 400 (using components of system 200) to generate a novel synthesized view 512.

In operation, the neural texture 510 may be generated by configuring the (few-shot) embedder network 245 (E) to generate a per-image texture latent vector $z_i^{tex}$. The system 200 may represent an image latent as k-shot texture $z_i^{img}$ for $i \in \{1 \ldots k\}$. The k-shot texture latents (shown as vectors 506) are then aggregated using an averaging equation, as shown in equation [3] below:

$$z^{tex} = \left(\frac{1}{k}\right)\sum_{i=1}^{k} z_i^{tex} \qquad [3]$$

where the aggregated texture latent (shown as vector 508) is then provided to a (texture) generator network 247 (e.g., $G^{tex}$) that outputs the neural texture 510 (e.g., T) for a target subject $T=G^{tex}z^{tex}$.

Figure 6:
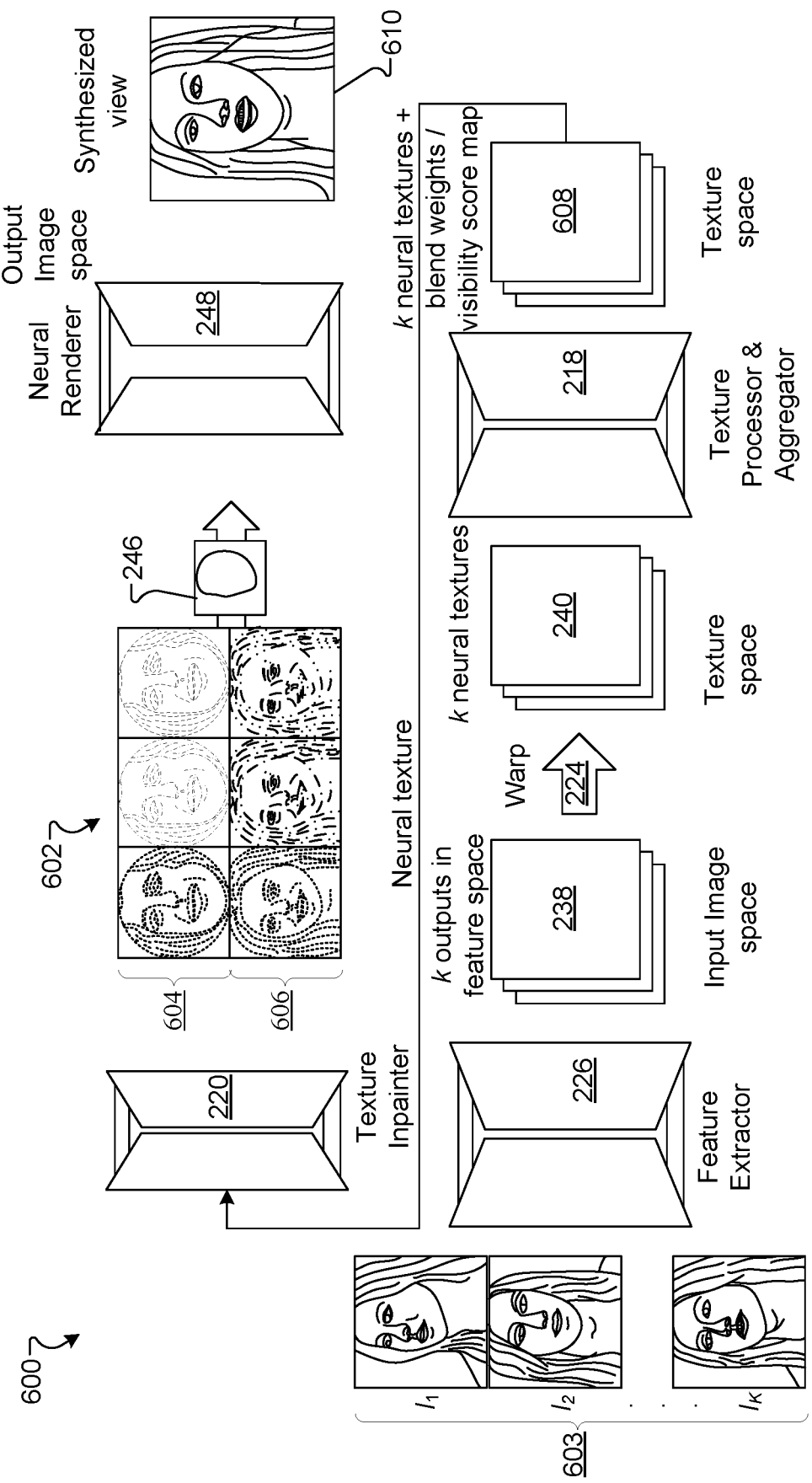
FIG. 6 is a block diagram of an example architecture for generating neural textures using inverse rendering techniques, according to implementations described throughout this disclosure.

FIG. 6 is a block diagram of an example architecture 600 for generating neural textures (e.g., neural texture 602) using inverse rendering techniques, according to implementations described throughout this disclosure. Inverse rendering techniques may include any number of sub-processing modules. In the following example, at least three sub-processing modules are used. A first sub-processing module may include the feature extractor network 226. A second sub-processing module may include the image warp engine 224. A third sub-processing module may include the texture processor/aggregator 218.

Given few-shot images of a subject (e.g., user), system 200 may perform an inverse rendering technique to construct a corresponding neural texture for the user. The inverse rendering techniques described herein may include performing estimations of physical attributes of a scene (e.g., reflectance, geometry, lighting, etc.) with respect to an image of a user (e.g., a user's head, neck, hair, torso, etc.). In an example operation of architecture 600, the feature extractor network F(.; φ) 226 may receive input images (e.g., Red Green Blue (RGB) frames $I_{1 \ldots k}^C$), shown here as images 603 (i.e., $I_1, I_2 \ldots I_k$) which are augmented with corresponding depth images $I_{1 \ldots k}^D$ and UV maps $I_{1 \ldots k}^{UV}$.

The feature extractor network 226 may project each of the k-shot inputs to a geometry-aware feature space of the same resolution as the input images $x_{1 \ldots k}$ where:

$$x_i = F(I_i^C, I_i^D, I_i^{UV}) \in R^d \qquad [4]$$

Next, the projected images are warped into UV space to generate a neural texture $y_i \in R^d$ (e.g., textures 134) per input image. A texture processor network $P(.;\omega)$ post-processes each neural texture $y_i$ (e.g., textures 134) and also outputs an extra score map $S_i$, where the score at each point in texture space indicates its visibility (e.g., visibility score 236) in the corresponding input image, as shown by equation [5] below:

$$(\tilde{y}_i \mid S_i) = P(y_i) \in R^{d+1} \qquad [5]$$

For example, the feature extractor 226 may generate one or more feature maps 238, represented as multiple feature maps 238 (shown in FIG. 6). The feature maps 238 represent the features of the input images in feature space. For example, for each input image 603, a feature map 238 may be generated using extracted features of the images.

Each feature map 238 may be warped using image warp engine 224, for example, to generate a number of texture maps 240. For example, if three input images are provided to system 200, the feature extractor 226 may extract three feature maps, one for each input image 603. The image warp engine 224 may warp each of the three feature maps 238 into a texture map 240, resulting in three texture maps, as shown in FIG. 6.

Next, the neural texture generator 222 using the texture processor/aggregator 218 may apply soft-max on the k visibility score 236 (e.g., maps) to obtain per-point attention weight maps 608 $\{A_1 \ldots A_k\}$. The k neural textures are aggregated as a weighted average based on the predicted attention weights to represent an aggregated k neural textures with attention weights, and visibility scores, which are aggregated in texture space, as shown by equation [6] below:

$$\tilde{T} = \sum_{i=1}^{k} A_i \cdot \tilde{y}_i \qquad [6]$$

The aggregated texture $\tilde{T}$ may contain missing parts that were not visible in any of the input views. The missing parts of the texture can be in-painted based on their determined local neighborhood. Alternatively, the missing parts of the texture can be in-painted by assuming that large parts of the texture are symmetric around the vertical axis and that missing parts from one half can be approximated from the corresponding values at the other half. Therefore, the texture in-painter 220 may concatenate the aggregated neural texture with a horizontally flipped version of the aggregated neural texture (e.g., a ninety degree rotation). The concatenated version of the texture may be provided to the texture in-painter network $G(; \psi)$ (e.g., texture in-painter 220), which may output the final neural texture 602. The equation [7] below represents the concatenated version of the texture:

$$T = G(\tilde{T} \mid \text{hor\_flip}(\tilde{T})) \qquad [7]$$

where | denotes channel-wise concatenation and hor_flip denotes horizontal flipping (e.g., ninety degree rotation) around the vertical axis.

The neural texture 602 represents learned feature maps that are trained on a neural network. In this example, the neural texture includes one or more maps that are overlaid onto 2D or 3D mesh proxies. The portion 604 of the neural texture 602 represents textures generated using the face mesh proxy (e.g., 302) while the portion 606 represents textures generated using the planar proxy (e.g., 304) to capture hair and/or torso portions. The three images in portion 604 may represent a nine channel texture with three RGB color images of a first set of feature points of input images 603. The three images in portion 606 may represent a nine channel texture with three RGB color images of a second and different set of feature points of input images 603. In addition, the visibility scores 236 (e.g., maps) may be used as yet another channel of information for the textures represented by neural texture 602.

Upon completion of generating the predicted neural texture T (e.g., neural texture 602), the system 200 may use sampler 246 to sample the neural texture 602 from the mesh proxy geometry, such as augmented mesh proxy geometry 300, shown in FIG. 3A. Here, the augmented mesh proxy geometry 300 includes the use of the face mesh proxy geometry 302 and the planar proxy geometry 304. Augmented mesh proxy geometry 300 may be sampled for any novel view. The resulting sampled texture may be provided to the neural renderer 248 (e.g., a neural renderer network $R(.;\theta)$) that may synthesize a view 610, as shown in equation [8] below:

$$\hat{I} = R(T^S) \text{ where } T^S = \text{sample2D}(T, I_t^{UV}) \qquad [8]$$

The neural renderer network R 248 may recover the target geometry and appearance of the user using the low-dimensional per-point descriptors of the neural texture 602.

Figure 7:
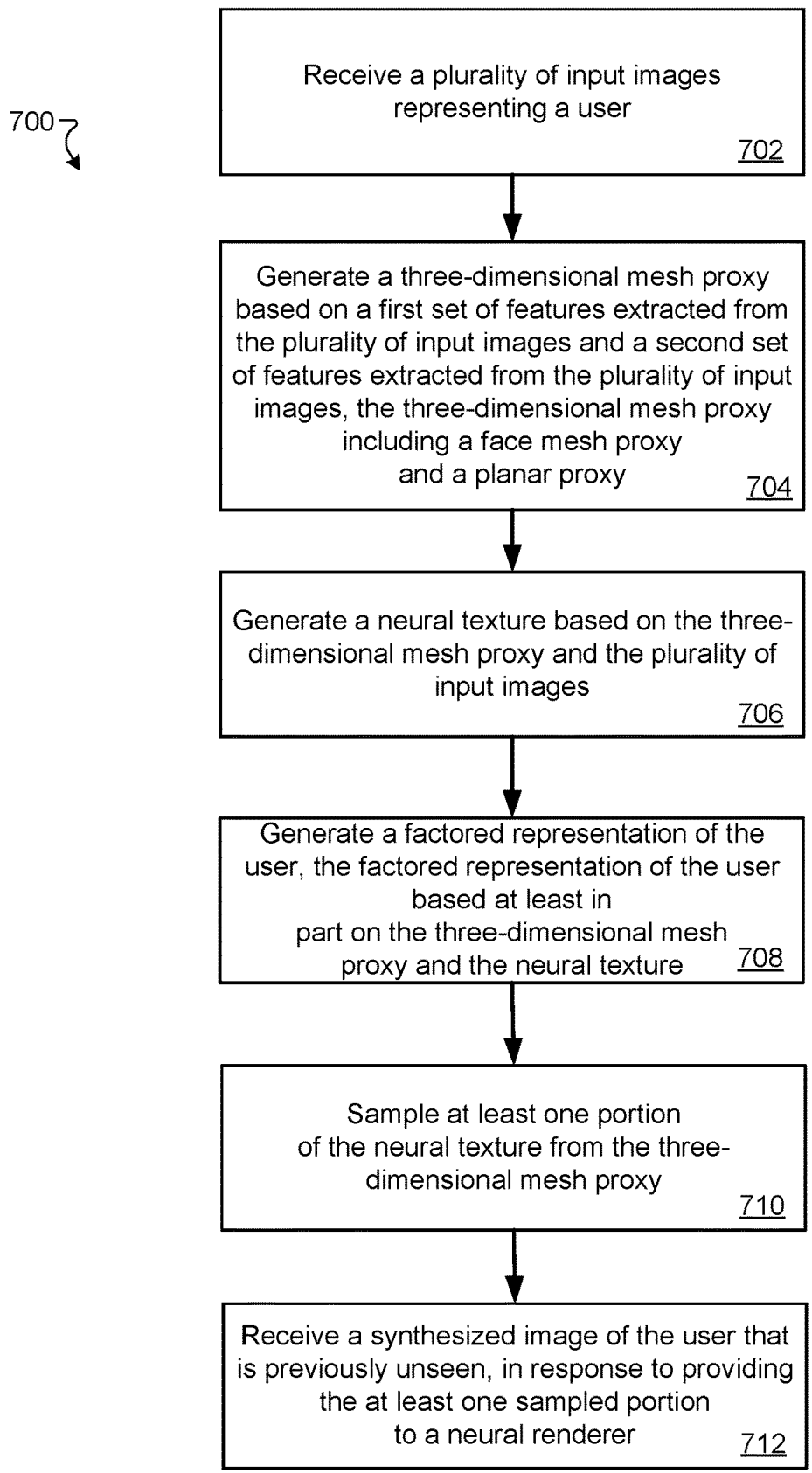
FIG. 7 is a flow chart diagramming one example of a process to generate synthesized content using neural textures based on a 3D proxy geometry models, according to implementations described throughout this disclosure.

FIG. 7 is a flow chart diagramming one example of a process 700 to generate synthesized content using neural textures based on a 3D proxy geometry models, according to implementations described throughout this disclosure. In short, the process 800 may provide an example of using 3D proxy geometries with a mesh algorithms to generate few-shot novel views of unseen 2D and 3D images of users, for example.

The process 700 may utilize an image processing system with at least one processing device and memory storing instructions that when executed cause the processing device to perform the plurality of operations and computer implemented steps described in the claims. In general, the systems 100, 200, and/or architectures 400, 500, and/or 600 may be used in the description and execution of process 700. Each of systems 100, 200, and architectures 400, 500, and/or 600 may, in some implementations, represent a single system.

In general, process 700 utilizes the systems and algorithms described herein to obtain or retrieve few-shot images of a target subject and perform novel view synthesis. For example, the process 700 may include processing and aggregating the few-shot inputs to construct a 3D mesh proxy together with a learned neural texture for the target subject. To synthesize a novel view, the learned texture may be sampled from the proxy geometry and passed to a neural renderer network that synthesizes the target view. In some implementations, an encoder-decoder architecture may be employed to generate the neural texture for the target subject. In some implementations, an inverse rendering technique may be used to generate the neural texture.

At block 702, the process 700 includes receiving a plurality of input images (e.g., input shots 402) representing a user. For example, the server 216 may receive, obtain, and/or capture images of a user 104 in real time or from prior video conferencing activities and/or other image capturing activities. The input images may include user face, features, hair, neck, or other torso portions, etc. In general, such input images may be few-shot images in which fewer than four images are used within process 700. In some implementations, three input images are used to carry out steps of process 700. In some implementations, a single image may be used to carry out steps of process 700.

At block 704, the process 700 includes generating a 3D mesh proxy (e.g., augmented mesh proxy 300) based on a first set of features (e.g., stored in feature maps 238) extracted from the plurality of input images 242. For example, the texture generator 216 may generate feature maps 238 using the first set of features that represent a face of the user. The first set of features may include portions of a face mesh, such as face mesh proxy 302. The 3D mesh proxy 300 may further be generated based on a second set of features (e.g., stored in feature maps 238) extracted from the plurality of input images 242. The second set of features may include features that represent hair and/or a portion of a torso of the user. The second set of features may be retrieved from a planar proxy, such as planar proxy 304.

At block 706, the process 700 includes generating a neural texture (e.g., neural texture 406) based on the 3D mesh proxy and the plurality of input images. For example, a neural texture generator, such as generator 404 or neural texture generator 222, may use the face mesh proxy 302 (shown in map 322) in combination with the planar proxy 304 (shown in map 324) to generate a 3D mesh proxy 406 of the user. The 3D mesh proxy 406 may include a portion 326 representing a face mesh texture 326 and a portion representing a head proxy texture 328 (i.e., a planar proxy).

At block 708, the process 700 includes generating a representation of the user. The representation of the user may be based at least in part on the 3D mesh proxy and the neural texture. For example, the texture-processor aggregator 218 may generate the mesh proxy geometries while the neural texture generator 222 may generate the neural texture. Thus, system 200 may generate the first set of features representing a face of the user and a second set of extracted features representing hair and a torso portion of a user, which may both be based on the mesh proxy and a learned neural texture. In general, the representation of the user represents appearance per each surface point represented in the neural texture 134. Such appearance may be visible in some places and not visible in others of the neural texture. Thus, a visibility score 236 may be used when sampling, or otherwise accessing the neural texture. In some implementations, the system 200 may store an appearance descriptor per surface point to represent high frequency details about the appearance of the user, or view-dependent effects of the appearance of the user, like specular highlights on the skin.

At block 710, the process 700 includes sampling at least one portion of the neural texture from the 3D mesh proxy 300. For example, the sampler 246 may perform a 2D sampling of the neural texture. That is, sampler 246 may sample the neural texture 406 from the proxy geometry (represented as combined 3D mesh proxy 300). In some implementations, a predicted neural texture is sampled from the mesh proxy for any novel view. In some implementations, the sampler 246 represents a 2D sampler that may use UV maps 232 to sample from neural textures. In some implementations, the neural texture 406 is a learned neural texture generated and sampled from the plurality of input images 402, which may include fewer than four captured image frames of the user.

At block 712, the process 700 includes providing the at least one sampled portion to a neural renderer, such as neural renderer 248. In response, the system 200 may receive from the neural renderer 248, a synthesized image (e.g., synthesized view 250, synthesized view 412, etc.) of the user that is previously unseen by the image processing system. For example, the synthesized image may include a view (e.g., viewing the user at an angle, and/or with the user holding the head and/or viewing in a direction) that has not yet been recorded by the image processing system. The synthesized view 250 may be triggered for rendering on device 110 or 112, for example.

In some implementations, the synthesized image is generated to depict the user with a corrected viewpoint (i.e., with respect to eye gaze direction of a remote user) for a video conference. Thus, the corrected viewpoint may enable two users looking at each other over video conference to appear to one another as if holding direct eye contact. For example, the synthesized view of the user may be a similar pose of the user in an input image, but with a viewpoint corrected to simulate a view of the user gazing into a camera device associated with a system providing the video conference. Such a correction may provide presence for both users of the video conference system because the system 200 may provide an appearance of eye contact between two users accessing the video conference system.

In some implementations, generating the neural texture includes the user of aggregated latents, as depicted and described in FIG. 5. For example, the texture processor/aggregator 218 may generate a latent representation for each input image 242, 502 (e.g., image frames). The generated latent representations (e.g., k-shot texture latents) for each input image may be aggregated into a vector 508 using averaging techniques. The vector 508 may be provided to a texture generator network 247, for example. The neural texture 510 representing the user may be received, from the texture generator network 247. The neural texture 510 may be used to generate the synthesized view 512.

In some implementations, generating the neural texture includes using an inverse rendering algorithm, as depicted and described in FIG. 6. For example, the input images may be provided to a feature extractor network 226 which may extract at least a first set and a second set of features to augment the images 603 with corresponding depth images and UV maps 232. The system 200 may then project the extracted first set of features and the second set of features into a geometry-aware feature space based on the depth images (captured by depth sensor 206) and the UV maps 232 associated with the input images 603. The projecting may include generating a set of images having a matched resolution of the plurality of input images 603. For example, the system 200 may project each k-shot input to a geometry-aware feature extractor of the same resolution as the input images 603. For example, the system 200 may warp the set of images into UV space to generate a texture for each input image 603, as shown by k neural textures 134. (FIG. 6).

Next, the texture processor and aggregator 218 may generate, for each texture, a score map (e.g., a visibility score 236) for each point in texture space that indicates a visibility metric in the corresponding input image. In some implementations, visibility scores 236 (e.g., score maps) are generated by processing the neural texture of each image.

The visibility score 236 at each point in texture space indicates its visibility in a corresponding input image.

The system 200 may apply a soft-max operation to each score map (e.g., visibility score 236) to generate attention weights for each input image. The textures may then be aggregated according to a weighted average determined according to the attention weights. In some implementations, additional steps may be carried out by texture in-painter 220 to generate missing parts that may not be visible in any of the input images 603. The details carried out by the texture in-painter 220 are described above with reference to FIG. 2.

Figure 8:
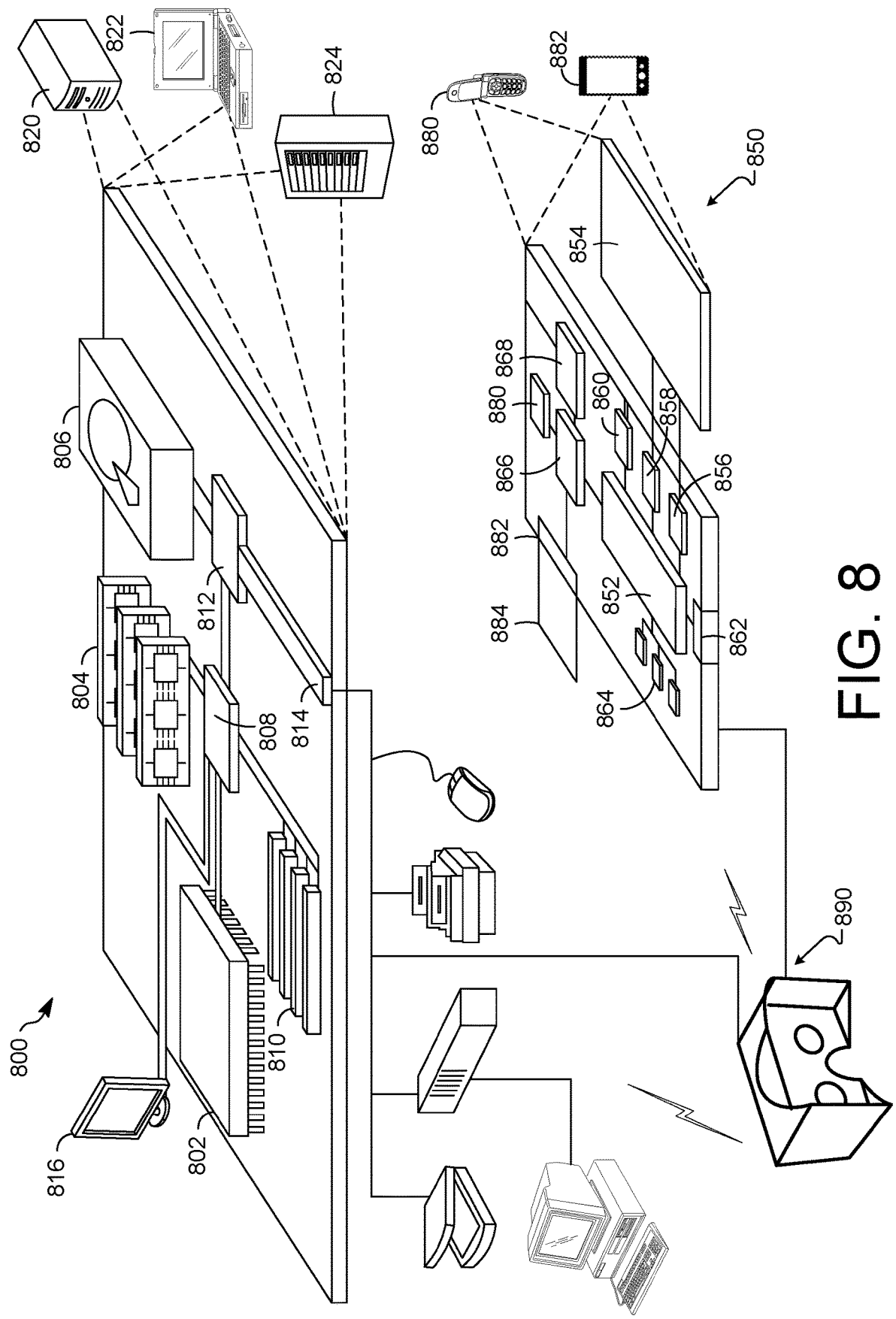
FIG. 8 shows an example of a computer device and a mobile computer device, which may be used with the techniques described herein.

FIG. 8 shows an example of a computer device 800 and a mobile computer device 850, which may be used with the described techniques. Computing device 800 can include a processor 802, memory 804, a storage device 806, a high-speed interface 808 connecting to memory 804 and high-speed expansion ports 810, and a low speed interface 812 connecting to low speed bus 814 and storage device 806. Components 802, 804, 806, 808, 810, and 812, are interconnected using various busses, and can be mounted on a common motherboard or in other manners as appropriate. Processor 802 can process instructions for execution within the computing device 800, including instructions stored in the memory 804 or on storage device 806 to display graphical information for a GUI on an external input/output device, such as display 816 coupled to high speed interface 808. In some embodiments, multiple processors and/or multiple buses can be used, as appropriate, along with multiple memories and types of memory. In addition, multiple computing devices 800 can be connected, with each device providing portions of the necessary operations (e.g., as a server bank, a group of blade servers, or a multi-processor system).

Memory 804 stores information within computing device 800. In one embodiment, memory 804 is a volatile memory unit or units. In another embodiment, memory 804 is a non-volatile memory unit or units. Memory 804 may also be another form of computer-readable medium, such as a magnetic or optical disk.

Storage device 806 can provide mass storage for the computing device 800. In one embodiment, storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 804, storage device 806, or memory on processor 802.

High speed controller 808 manages bandwidth-intensive operations for computing device 800, while low speed controller 812 manages lower bandwidth-intensive operations. Such allocation of functions is exemplary only. In one embodiment, high-speed controller 808 is coupled to memory 804, display 816 (e.g., through a graphics processor or accelerator), and to high-speed expansion ports 810, which may accept various expansion cards (not shown). Low-speed controller 812 can be coupled to storage device 806 and low-speed expansion port 814. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown), such as device 850. Each of such devices may contain one or more of computing device 800, 850, and an entire system may be made up of multiple computing devices 800, 850 communicating with each other.

Computing device 850 includes processor 852, memory 864, an input/output device such as display 854, communication interface 866, and transceiver 868, among other components. Device 850 may also be provided with a storage device, such as a microdrive or other device, to provide additional storage. Each of components 850, 852, 864, 854, 866, and 868, are interconnected using various buses, and several of the components may be mounted on a common motherboard or in other manners as appropriate.

Processor 852 can execute instructions within the computing device 850, including instructions stored in memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to display 854. Display 854 may be, for example, a TFT LCD (Thin-Film-Transistor Liquid Crystal Display) or an OLED (Organic Light Emitting Diode) display, or other appropriate display technology. Display interface 856 may comprise appropriate circuitry for driving display 854 to present graphical and other information to a user. Control interface 858 may receive commands from a user and convert them for submission to processor 852. In addition, external interface 862 may communicate with processor 852, so as to enable near area communication of device 850 with other devices. External interface 862 can provide, for example, for wired or wireless communication in some embodiments multiple interfaces can be used.

Memory 864 stores information within computing device 850. Memory 864 can be implemented as one or more of a computer-readable medium or media, a volatile memory unit or units, or a non-volatile memory unit or units. Expansion memory 884 may also be provided and connected to device 850 through expansion interface 882, which may include, for example, a SIMM (Single In Line Memory Module) card interface. Such expansion memory 884 may provide extra storage space for device 850, or may also store applications or other information for device 850. Specifically, expansion memory 884 may include instructions to carry out or supplement the processes described above, and may include secure information also. Thus, for example, expansion memory 884 can be a security module for device 850, and can be programmed with instructions that permit secure use of device 850. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 864, expansion memory 884, or memory on processor 852 that may be received, for example, over transceiver 868 or external interface 862.

Device 850 can communicate wirelessly through communication interface 866, which can include digital signal processing circuitry where necessary. Communication interface 866 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, such as using a Bluetooth, Wi-Fi, or other such transceiver (not shown). In addition, GPS (Global Positioning System) receiver module 880 can provide additional navigation- and location-related wireless data to device 850, which can be used as appropriate by applications running on device 850.

Device 850 can also communicate audibly using audio codec 860, which may receive spoken information from a user and convert it to usable digital information. Audio codec 860 may likewise generate audible sounds for a user, such as through a speaker, e.g., in a handset of device 850. Such sound can include sound from voice telephone calls, can include recorded sound (e.g., voice messages, music files, etc.) and can also include sound generated by applications operating on device 850.

Computing device 850 can be implemented in a number of different forms, as shown in the figure. For example, it can be implemented as cellular telephone 880. It can also be implemented as part of smart phone 882, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 8 can include sensors that interface with a virtual reality headset (VR headset/HMD device 890). For example, one or more sensors included on computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 850 can use the sensors to determine an absolute position and/or a detected rotation of the computing device in the VR space that can then be used as input to the VR space. For example, computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some embodiments, one or more output devices included on the computing device 850 can provide output and/or feedback to a user of the VR headset 890 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 850 can be placed within VR headset 890 to create a VR system. VR headset 890 can include one or more positioning elements that allow for the placement of computing device 850, such as smart phone 882, in the appropriate position within VR headset 890. In such embodiments, the display of smart phone 882 can render stereoscopic images representing the VR space or virtual environment.

In some embodiments, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. As just one example, computing device can be a laser pointer. In such an example, computing device 850 appears as a virtual laser pointer in the computer-generated, 3D environment. As the user manipulates computing device 850, the user in the VR space sees movement of the laser pointer. The user receives feedback from interactions with the computing device 850 in the VR environment on the computing device 850 or on the VR headset 890.

In some embodiments, a computing device 850 may include a touchscreen.

For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method utilizing an image processing system with at least one processing device to perform operations including:
receiving a plurality of input images of a participant in a three-dimensional (3D) video conference;
generating a three-dimensional mesh proxy based on features extracted from the plurality of input images;
generating, by a neural network, a neural texture based on the three-dimensional mesh proxy and the plurality of input images using inverse rendering on a texture space;
sampling, at least one portion of the neural texture from the three-dimensional mesh proxy; and
producing a synthesized image of the participant based on the at least one sampled portion using a neural renderer.

2. The method of claim 1, wherein:
the extracted features includes a first set of features that represent a face of the participant; and
a second set of features that represent hair and a portion of a torso of the participant.

3. The method of claim 1, wherein the neural texture is a learned neural texture, and the plurality of input images includes fewer than four captured image frames of the participant.

4. The method of claim 1, wherein generating the neural texture includes:
generating a latent representation for each input image;
aggregating the generated representations for each input image into a vector;
providing the vector to a texture generator network; and
receiving, from the texture generator network, the neural texture representing the participant.

5. The method of claim 1, wherein generating the neural texture includes:
projecting the extracted features into a geometry-aware feature space based on depth images and UV maps associated with the input images, the projecting including generating a set of images having a matched resolution of the plurality of input images;
warping the set of images into UV space to generate a texture for each input image;
generating, for each texture, a score map for each point in texture space that indicates a visibility metric in a corresponding one of the input images;
applying a soft-max operation to each score map to generate attention weights for each input image; and
aggregating the textures according to a weighted average determined according to the attention weights.

6. The method of claim 1, further comprising:
generating a representation of the participant that represents appearance per each surface point represented in the neural texture, and
storing an appearance descriptor per surface point to represent high frequency details about the appearance of the participant.

7. The method of claim 1, wherein the synthesized image is generated to depict the participant with a corrected eye gaze direction for a 3D videoconference, the corrected eye gaze direction simulating a view of the participant gazing into a stereoscopic display device associated with a system providing the 3D videoconference.

8. A system, comprising:
at least one processing device; and a memory storing instructions that when executed cause the system to perform operations including:
receiving a plurality of input images of a participant in a 3D video conference;
generating a three-dimensional mesh proxy based on features extracted from the plurality of input images;
generating, by a neural network, a neural texture based on the three-dimensional mesh proxy and the plurality of input images using inverse rendering on a texture space;
generating a representation of the participant based at least in part on the three-dimensional mesh proxy and the neural texture;
sampling, using the representation of the participant, at least one portion of the neural texture from the three-dimensional mesh proxy; and
in response to providing the at least one sampled portion to a neural renderer, receiving, from the neural renderer, a synthesized image of the participant.

9. The system of claim 8, wherein:
the extracted features includes a first set of features that represent a face of the participant; and
a second set of features that represent hair and a portion of a torso of the participant.

10. The system of claim 8, wherein the neural texture is a learned neural texture and the plurality of input images includes fewer than four captured image frames of the participant.

11. The system of claim 8, wherein generating the neural texture includes:
generating a latent representation for each input image;
aggregating the generated representations for each input image into a vector;
providing the vector to a texture generator network; and
receiving, from the texture generator network, the neural texture representing the participant.

12. The system of claim 8, wherein generating the neural texture includes:
projecting the extracted features into a geometry-aware feature space based on depth images and UV maps associated with the input images, the projecting including generating a set of images having a matched resolution of the plurality of input images;
warping the set of images into UV space to generate a texture for each input image;
generating, for each texture, a score map for each point in texture space that indicates a visibility metric in a corresponding one of the input images;
applying a soft-max operation to each score map to generate attention weights for each input image; and
aggregating the textures according to a weighted average determined according to the attention weights.

13. The system of claim 8, wherein the synthesized image is generated to depict the participant with a corrected eye gaze direction for a 3D video conference, the corrected eye gaze direction simulating a view of the participant gazing into a stereoscopic display device associated with a system providing the 3D video conference.

14. A non-transitory machine-readable medium having instructions stored thereon, wherein the instructions, when executed by a processor, cause a computing device to:
receive a plurality of input images of a participant in a 3D video conference;
generate a three-dimensional mesh proxy based on features extracted from the plurality of input images, the three-dimensional mesh proxy including a face mesh proxy and a planar proxy;
generate, by a neural network, a neural texture based on the three-dimensional mesh proxy and the plurality of input images using inverse rendering on a texture space;
generate a representation of the participant based at least in part on the three-dimensional mesh proxy and the neural texture;
sample, using the representation of the participant, at least one portion of the neural texture from the three-dimensional mesh proxy;
provide the at least one sampled portion to a neural renderer; and
receive a synthesized image of the participant, the synthesized image of the participant representing a previously unseen view of the participant.

15. The machine-readable medium of claim 14, wherein:
the extracted features includes a first set of features that represent a face of the participant; and
a second set of extracted features includes features that represent hair and a portion of a torso of the participant.

16. The machine-readable medium of claim 14, wherein the neural texture is a learned neural texture generated using the plurality of input images, the plurality of input images including fewer than four captured image frames of the participant.

17. The machine-readable medium of claim 14, wherein generating the neural texture includes:
generating a latent representation for each input image;
aggregating the generated representations for each input image into a vector;
providing the vector to a texture generator network; and
receiving, from the texture generator network, the neural texture representing the participant.

18. The machine-readable medium of claim 14, wherein generating the neural texture includes:
projecting the extracted features into a geometry-aware feature space based on depth images and UV maps associated with the input images, the projecting including generating a set of images having a matched resolution of the plurality of input images;
warping the set of images into UV space to generate a texture for each input image;
generating, for each texture, a score map for each point in texture space that indicates a visibility metric in a corresponding one of the input images;
applying a soft-max operation to each score map to generate attention weights for each input image; and
aggregating the textures according to a weighted average determined according to the attention weights.

19. The machine-readable medium of claim 14, wherein the generated representation of the participant represents appearance per each surface point represented in the neural texture, and wherein the instructions further comprise storing an appearance descriptor per surface point to represent high frequency details about the appearance of the participant.

20. The machine-readable medium of claim 14, wherein the synthesized image is generated to depict the participant with a corrected eye gaze direction for a 3D video conference, the corrected eye gaze direction simulating a view of the participant gazing into a stereoscopic display device associated with a system providing the 3D video conference.

* * * * *

UNITED STATES PATENT AND TRADEMARK OFFICE
CERTIFICATE OF CORRECTION

PATENT NO. : 12,026,833 B2
APPLICATION NO. : 17/310678
DATED : July 2, 2024
INVENTOR(S) : Martin Brualla et al.

It is certified that error appears in the above-identified patent and that said Letters Patent is hereby corrected as shown below:

In the Claims

In Column 26, Claim 2, Line 23, delete "includes" and insert -- include --, therefor.

In Column 27, Claim 9, Line 24, delete "includes" and insert -- include --, therefor.

Signed and Sealed this
Twenty-seventh Day of August, 2024

Katherine Kelly Vidal
*Director of the United States Patent and Trademark Office*